(12) United States Patent
Tsai

(10) Patent No.: US 7,035,176 B2
(45) Date of Patent: Apr. 25, 2006

(54) METHOD AND DEVICE FOR TIMELY OUTPUTTING FOCUSING COMPLETION SIGNAL TO REALIZE FOCUSING CONDITION OF OPTICAL PICKUP HEAD

(75) Inventor: Chin-Yin Tsai, Taipei (TW)

(73) Assignee: VIA Optical Solution, Inc., Taipei (TW)

( * ) Notice: Subject to any disclaimer, the term of this patent is extended or adjusted under 35 U.S.C. 154(b) by 649 days.

(21) Appl. No.: 10/251,114

(22) Filed: Sep. 20, 2002

(65) Prior Publication Data

US 2003/0161230 A1   Aug. 28, 2003

(30) Foreign Application Priority Data

Feb. 26, 2002   (TW) ............................... 91103388 A

(51) Int. Cl.
*G11B 7/00* (2006.01)
(52) U.S. Cl. ................................. 369/44.29; 369/44.25
(58) Field of Classification Search ............. 369/44.15, 369/44.26, 44.28, 44.29, 44.34, 124.15
See application file for complete search history.

(56) References Cited

U.S. PATENT DOCUMENTS 4,952,816 A    8/1990   Dunning
5,894,463 A *  4/1999   Okawa et al. ........... 369/44.35

* cited by examiner

*Primary Examiner*—Nabil Hindi
(74) *Attorney, Agent, or Firm*—Madson & Austin

(57) ABSTRACT

A method is provided for outputting a focusing completion signal to realize a focusing condition of an optical pickup head for an optical access apparatus. The method is described as follows. A trace shift of the optical pickup head along a focusing direction is actuated in response to a focus control signal when a focus adjustment operation starts. Then, a focusing error signal and a sub-beam addition signal are generated in response to optical signals from the optical pickup head. A closed-loop enable signal is generated to enable a closed-loop control operation in response to a specified situation of the focusing error signal. The focusing completion signal is outputted when the sub-beam addition signal is at a level greater than a threshold value and when the closed-loop enable signal is generated.

20 Claims, 6 Drawing Sheets

METHOD AND DEVICE FOR TIMELY OUTPUTTING FOCUSING COMPLETION SIGNAL TO REALIZE FOCUSING CONDITION OF OPTICAL PICKUP HEAD

FIELD OF THE INVENTION

The present invention relates to a method and device for outputting a focusing completion signal, and more particularly to a method and device for outputting a focusing completion signal to realize a focusing condition of an optical pickup head.

BACKGROUND OF THE INVENTION

Optical discs such as compact disks (CDs), video compact disks (VCDs) and digital versatile disk (DVDs) can be played by using kinds of recording and reproducing apparatuses. When an optical pickup head of an optical disk drive is used to access information from an optical disc, the light emitted by a light source such as a laser diode is focused by an objective lens of the optical pickup head and then projected on an optical disc. The light reflected by the optical disc is detected by a photodetector and an operation for realizing information read from the disc is then activated consecutively. Referring to FIG. 1, the optical pickup head 10 moves along two main directions, i.e. a direction perpendicular to the disc face, referred as a focusing direction F, and a direction parallel to the disc face, referred as a tracking direction T.

As one skilled in the art knows, focusing errors and tracking errors are usually arisen when a disc is rotating. The focusing errors are generally caused by vibrations of the disc in the focusing direction F, and the tracking errors are caused by eccentricity of the disc in the tracking direction T. FIG. 2 shows a focus control system for correcting these errors mentioned above. The optical pickup head 20 has a photodetector having four sensors (not shown) that detect reflected light beams from the disc and produce sub-beam signals A, B, C and D, respectively. These sub-beam signals are amplified through a pre-amplifier 21 to generate a focusing error signal Fe and a sub-beam addition signal (SBAD). The focusing error signal Fe is substantially a difference between the summation of sub-beam signals A and C and the summation of sub-beam signals B and D, i.e. (A+C)−(B+D). The sub-beam addition signal SBAD is substantially the summation of these sub-beam signals, i.e. (A+B+C+D). The focusing error signal Fe and the sub-beam addition signal SBAD are processed by a digital signal processor (DSP) 22 to generate a focus control signal $Fo_o$ used by an actuator 23. Therefore, the actuator 23 may provide a moving force for actuating a trace shift of the optical pickup head 20 along the focusing direction F. When the optical pickup head 20 completes required focusing operation, the digital signal processor 22 produces a focusing completion signal Fok to a micro-controller 24.

FIG. 3 is a timing waveform diagram illustrating the corresponding signals processed in the conventional focus control system of FIG. 2, wherein a focusing error signal Fe changes as the focusing control signal $Fo_o$ rises. The $Fo_o$ signal is used for a focus adjustment operation, which moves the pickup head downward to a predetermined position (Fo_o waveform will be in valley) along the focusing direction F and then pulls up the pickup head gradually accompanied by evaluations to focusing error signal Fe. Basically, the value of the focusing error signal Fe will rise in the beginning and then fall to zero (or less) along the time axis (i.e. the horizontal axis of FIG. 3). When the first peak of the focusing error signal Fe falls to zero at t=t1 (i.e. Fe falls from the peak value to zero at the first time), the digital signal processor 22 starts a closed-loop control operation, and the waveform of the focusing control signal $Fo_o$ is adjusted in response to the focusing error signal Fe. After the closed-loop control operation starts, the waveform of the sub-beam addition signal SBAD, as shown in a solid line, will maintain at a high level 302. When the sub-beam addition signal SBAD up-crosses a threshold value TV, the focus completion signal Fok will be issued at the end of the predetermined period PT and then transmitted to the micro-controller 24 to indicate the completion of the focusing operation.

Unfortunately, the waveform of the sub-beam addition signal SBAD might have deviations from the ideal waveform in FIG. 3. In practice, an unstable waveform may occur due to the variation of discs as shown in FIG. 4, which results in a misevaluation to the focusing completion timing. For example, a noise 40 occurring prior to the closed-loop control operation exceeds the threshold value TV may activate a wrong counting operation for the predetermined time period PT before the concerned peak 41 appears. At the end of the predetermined time period PT, the focusing completion signal Fok will be incorrectly switched to a high level and abnormally indicate a focusing completion operation. Such a mistake is therefore insufficient to provide a good focus control efficacy and becomes problematic in a high-speed optical disc.

SUMMARY OF THE INVENTION

Therefore, the present invention provide a method and a device for outputting a focusing completion signal at the right time to correctly realize a focusing condition of an optical pickup head.

In accordance with an aspect of the present invention, there is provided a method for outputting a focusing completion signal to correctly realize a focusing condition of an optical pickup head for an optical access apparatus. The method comprises the following steps. A trace shift of the optical pickup head along a focusing direction is actuated in response to a focus control signal under a focus adjustment operation. Then, a focusing error signal and a sub-beam addition signal are generated in response to optical signals from the optical pickup head. A closed-loop enable signal is issued to enable a closed-loop control operation in response to a specified situation of the focusing error signal. Finally, the focusing completion signal is outputted when the sub-beam addition signal is at a level greater than a threshold value and when the closed-loop enable signal is issued.

In accordance with the present invention, the optical access apparatus is an optical pickup apparatus such as a compact disk-read only memory (CD-ROM) drive or a digital versatile disk-read only memory (DVD-ROM) drive. Furthermore, the optical access apparatus still can be an optical recording apparatus including a compact disk-recordable (CD-R) drive, a compact disk-rewritable (CD-RW) drive, a digital versatile disk-recordable (DVD-R) drive, a digital versatile disk-rewritable (DVD-RW) drive, or a digital versatile disk-random access memory (DVD-RAM) drive.

In an embodiment, the specified situation of the focusing error signal is a condition when the first peak of the focusing error signal falls to a zero level.

In an embodiment, the method of the present invention further comprises a step of counting a predetermined time period when the sub-beam addition signal is at the level greater than the threshold value and the closed-loop enable signal is issued before outputting the focusing completion signal.

In accordance with another aspect of the present invention, there is provided a method for outputting a focusing completion signal to correctly realize a focusing condition of an optical pickup head for an optical access apparatus under a focus adjustment operation. The method comprises steps of generating a focusing error signal and a sub-beam addition signal in response to optical signals from the optical pickup head, generating a closed-loop enable signal to enable a closed-loop control operation when the first peak of the focusing error signal falls to a zero level, and outputting the focusing completion signal on specified conditions that the sub-beam addition signal is at a level greater than a threshold value and the closed-loop enable signal has been generated. The method of the present invention further comprises a step of counting a predetermined period of time when the specified conditions are fulfilled, and the focusing completion signal is outputted upon the predetermined period of time is up.

In accordance with another aspect of the present invention, there is provided a device for outputting a focusing completion signal to realize a focusing condition of an optical pickup head for an optical access apparatus. The device comprises a focusing error signal generator, a focus control signal generator and a closed-loop enable signal generator. The focusing error signal generator is electrically connected to the optical pickup head for generating a focusing error signal and a sub-beam addition signal in response to optical signals from the optical pickup head. The focus control signal generator is electrically connected to the focusing error signal generator for generating the focus control signal in response to the focusing error signal. The closed-loop enable signal generator is used for generating a closed-loop enable signal to enable a closed-loop control operation in response to a specified situation of the focusing error signal, wherein the focusing completion signal is outputted in response to a level of the sub-beam addition signal greater than a threshold value and the closed-loop enable signal.

In an embodiment, the device of the present invention further comprises means for counting a predetermined period of time before outputting the focusing completion signal.

Preferably, the closed-loop enable signal generator is included in the focus control signal generator.

Preferably, the focusing error signal generator includes a pre-amplifier.

Preferably, the focus control signal generator is a digital signal processor (DSP).

In an embodiment, the focusing completion signal is outputted to a micro-controller electrically connected to the focus control signal generator.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
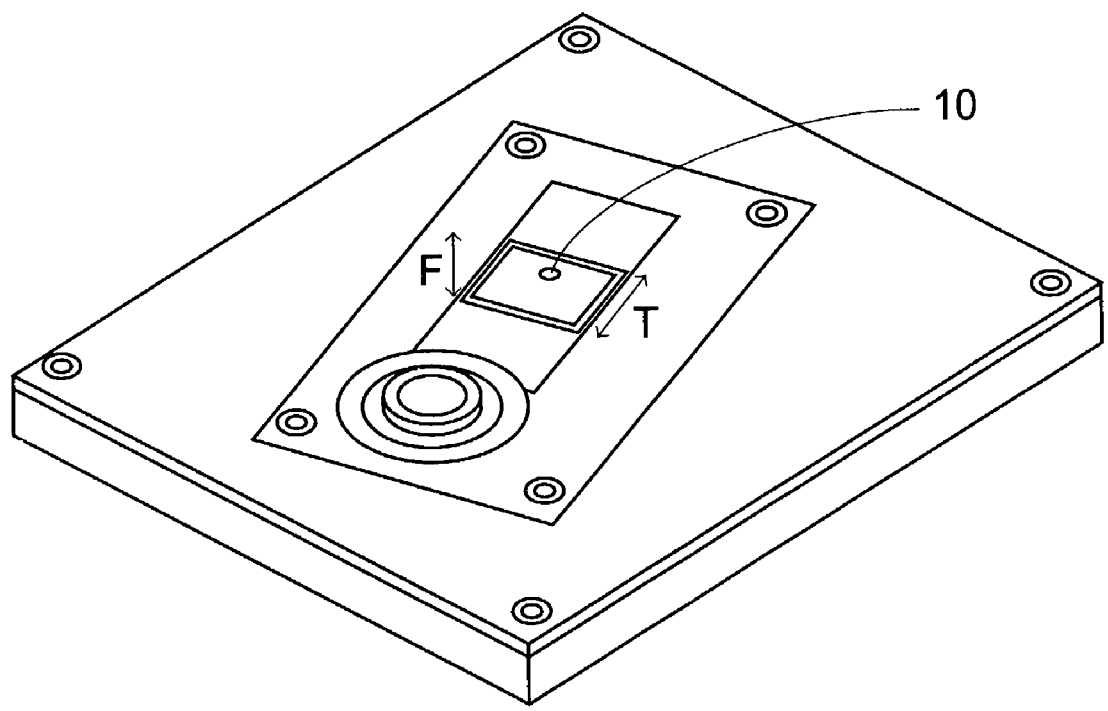
FIG. 1 schematically illustrates a typical optical pickup head.
Figure 2:
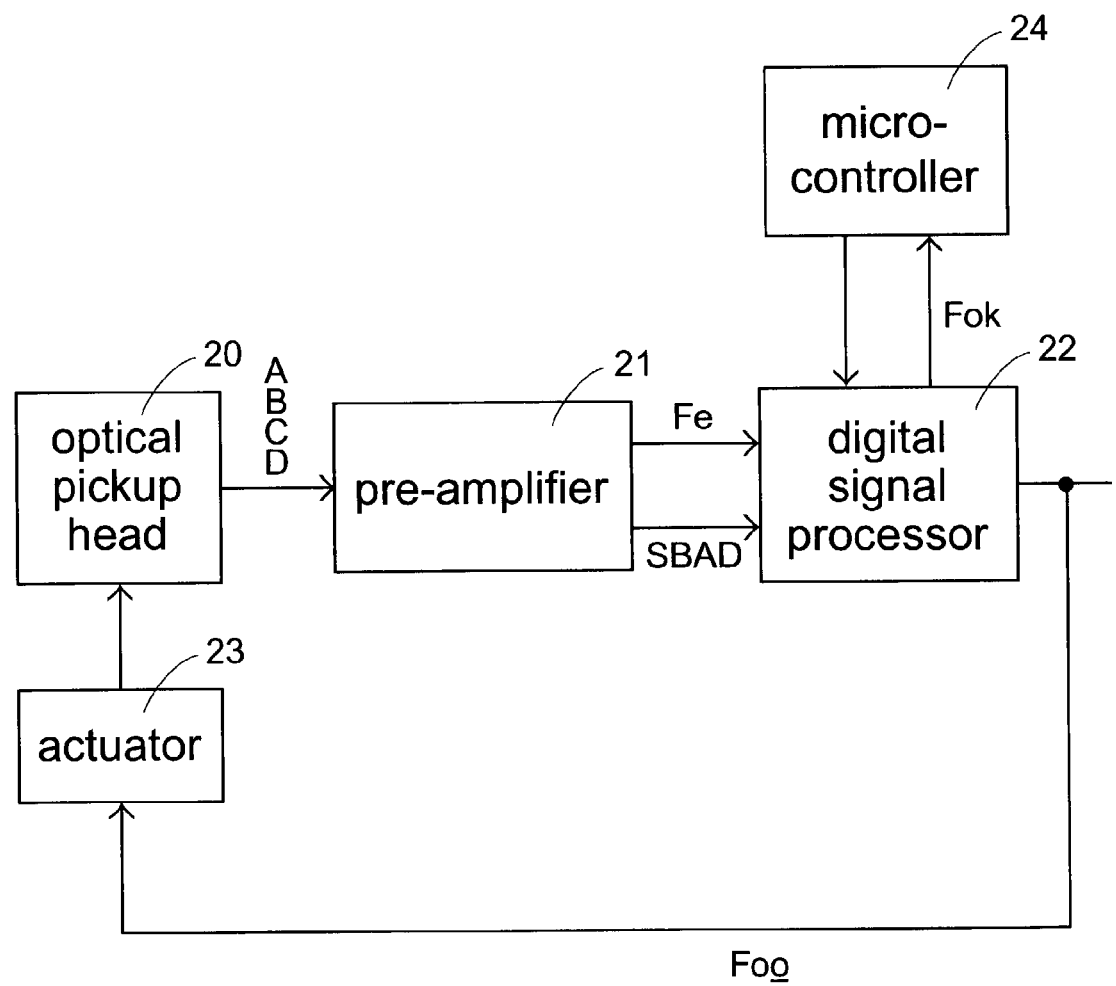
FIG. 2 is a functional block diagram illustrating a conventional focus control system.
Figure 3:
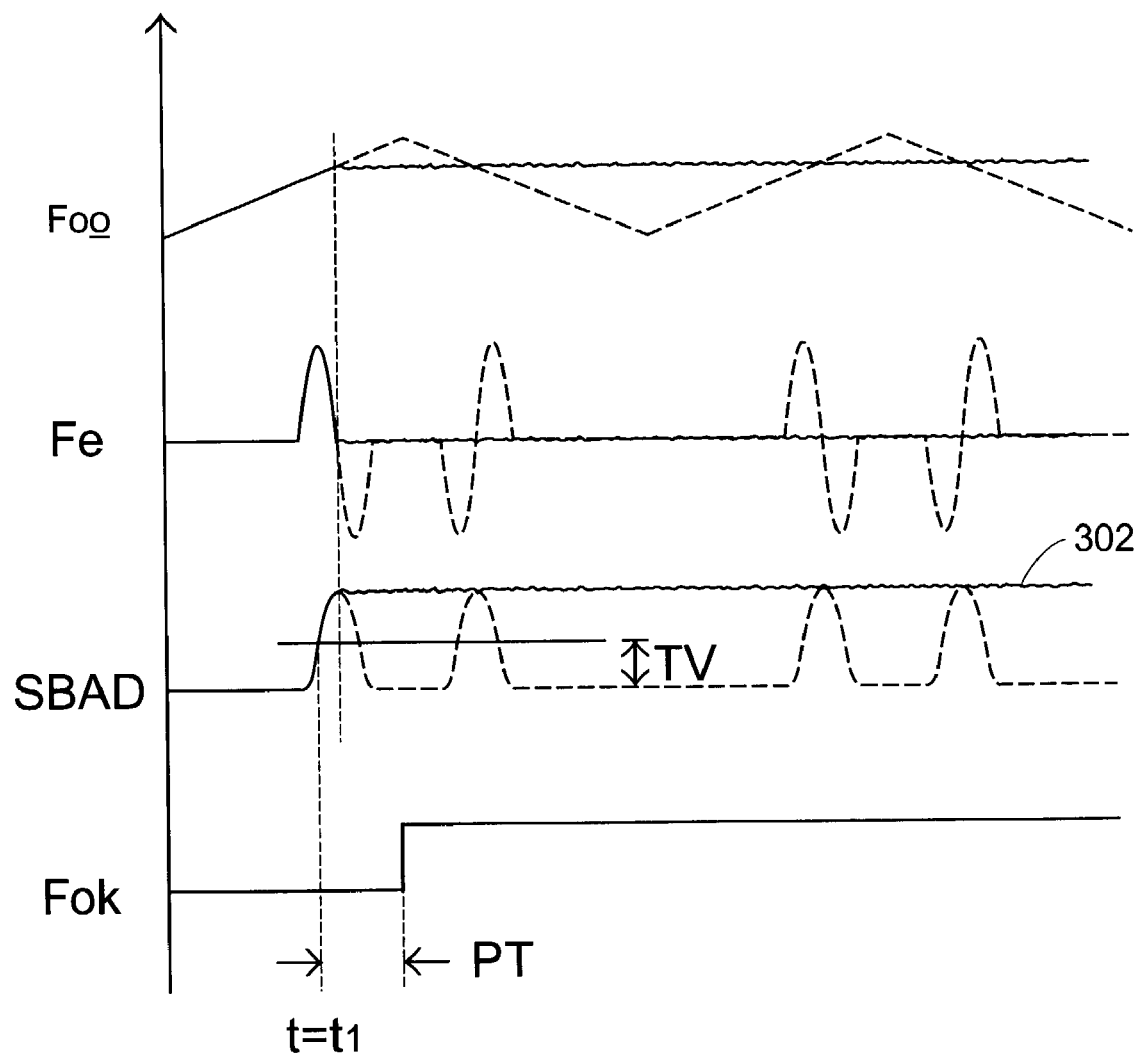
FIG. 3 is a timing waveform diagram illustrating the timing when a focusing completion signal is outputted by the conventional focus control system of FIG. 2.
Figure 4:
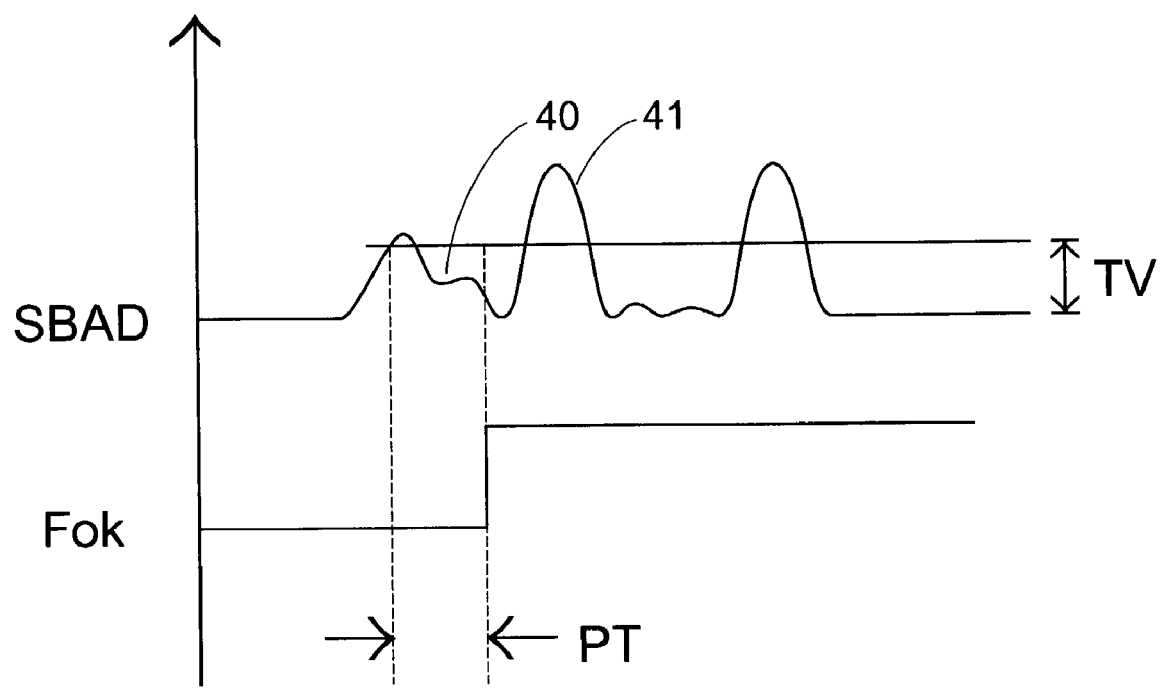
FIG. 4 is a timing waveform diagram showing an erroneous timing to output a focusing completion signal due to the noise resulting from variations of disks.
Figure 5:
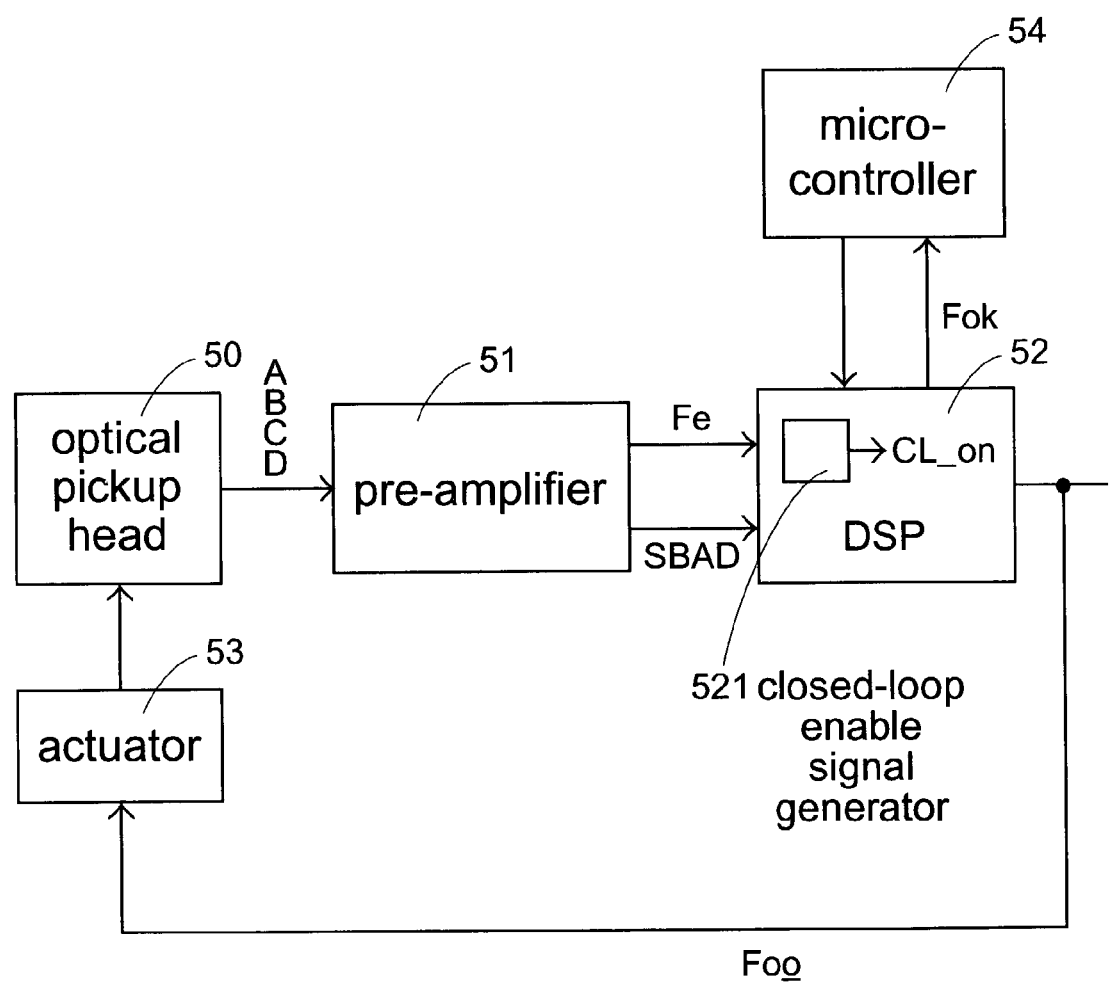
FIG. 5 is a functional block diagram illustrating a preferred embodiment of a focus control system according to the present invention.

Please refer to FIG. 5. The focus control system of the present invention comprises an optical pickup head 50, a pre-amplifier 51, a digital signal processor (DSP) 52, an actuator 53 and a micro-controller 54. The optical pickup head 50 has four sensors (not shown) that respectively receive reflected beams from a disc and then produce sub-beam signals A, B, C and D. These sub-beam signals are amplified through the pre-amplifier 21 to generate a focusing error signal Fe and a sub-beam addition signal (SBAD). The focusing error signal Fe is substantially a difference between the summation of sub-beam signals A and C and the summation of sub-beam signals B and D, i.e. (A+C)−(B+D). The sub-beam addition signal SBAD is substantially the summation of these sub-beam signals, i.e. (A+B+C+D). The focusing error signal Fe and the sub-beam addition signal SBAD are processed by the digital signal processor (DSP) 52 to generate a focus control signal $F_{oo}$ for an actuator 53 under a focus adjustment operation. Therefore, the actuator 53 may provide a moving force for actuating a trace shift of the optical pickup head 50 in the focusing direction. When the optical pickup head 50 has completed a focusing operation, the digital signal processor 52 outputs a focusing completion signal Fok to the micro-controller 54. The determination of the completion of the focusing operation will be described later.

Figure 6:
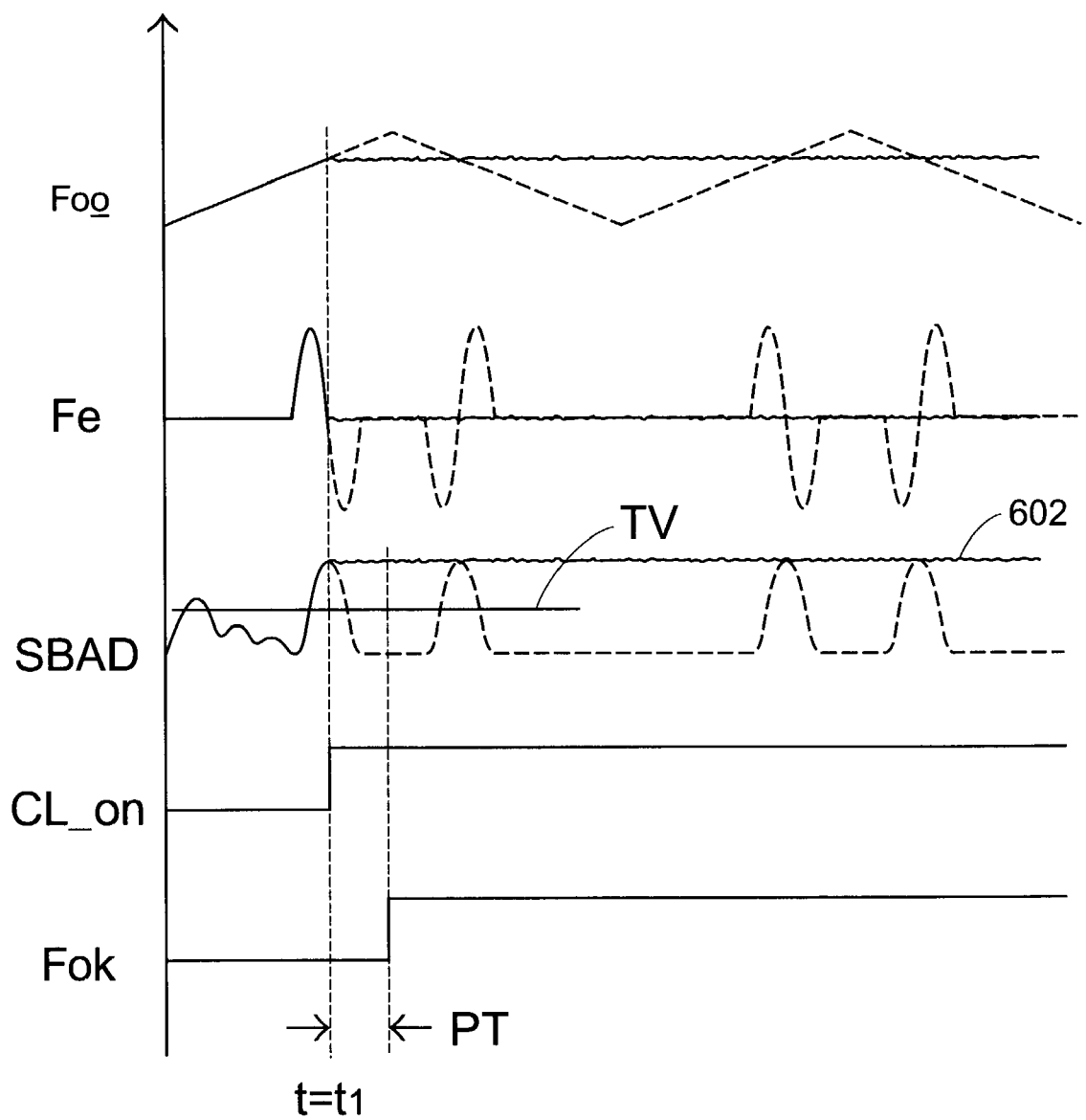
FIG. 6 is a timing waveform diagram illustrating the timing when a focusing completion signal is outputted by the focus control system of the present invention.

Please refer to FIG. 6. The focusing error signal Fe changes as the focusing control signal $F_{oo}$ rises after the focus adjustment operation starts. When the first peak of the focusing error signal Fe falls to zero at t=t1, a closed-loop enable signal generator 521 in the DSP 52 (FIG. 5) generates a closed-loop enable signal CL_on to enable a closed-loop control operation, and the waveform of the focusing control signal $F_{oo}$ is adjusted in response to the focusing error signal Fe. After the closed-loop control operation starts and the sub-beam addition signal SBAD up-crosses a threshold value TV simultaneously, the waveform of the sub-beam addition signal SBAD, as shown in a solid line, maintains at a high level 602. At the end of the predetermined time period PT, the focusing completion signal Fok is issued (i.e. switched to a high level) and transmitted to the micro-controller 54 to indicate the completion of the focusing operation. Practically, PT is substantially about 10~100 ms (milliseconds). On the other hand, the firmware associated with the DSP 52 may be modified to include programs for issuing the CL_on signal so that the DSP 52 may actuate the closed-loop enable signal generator 521 to generate the closed-loop enable signal CL_on for close-loop control operation. Additionally, the closed-loop enable signal generator 521 can be easily established by using some logic gates if necessary. Any ordinary person having skills in the art can modify the embodiment as his application but any modification or rearrangement within the spirit of the embodiment should be included in the appended claims.

Since the counting operation associated with the predetermined time period PT will not start until the sub-beam addition signal SBAD is at the level greater than the threshold value and the closed-loop enable signal CL_on is generated simultaneously, any noise occurring prior to the closed-loop control operation will not affect the focusing completion timing. Therefore, the focusing completion signal Fok is outputted at right time so that the focusing condition of the optical pickup head 50 can be correctly recognized.

The present invention is illustrated by referring to an optical pickup apparatus such as a compact disk-read only memory (CD-ROM) drive and a digital versatile disk-read only memory (DVD-ROM) drive. Nevertheless, the present invention can be applied to an optical recording apparatus, for example, a compact disk-recordable (CD-R) drive, a compact disk-rewritable (CD-RW) drive, a digital versatile disk-recordable (DVD-R) drive, a digital versatile disk-rewritable (DVD-RW) drive and a digital versatile disk-random access memory (DVD-RAM) drive.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for outputting a focusing completion signal to realize a focusing condition of an optical pickup head for an optical access apparatus, said method comprising steps of:
   generating a focusing error signal and a sub-beam addition signal in response to optical signals from said optical pickup head under a focus adjustment operation;
   generating a closed-loop enable signal to enable a closed-loop control operation in response to a first specified situation of said focusing error signal; and
   outputting said focusing completion signal when said sub-beam addition signal is at a second specified situation in comparison to a threshold value and when said closed-loop enable signal is issued.

2. The method according to claim 1 wherein said optical access apparatus is a compact disk-read only memory (CD-ROM) drive or a digital versatile disk-read only memory (DVD-ROM) drive.

3. The method according to claim 1 wherein said optical access apparatus is a compact disk-recordable (CD-R) drive, a compact disk-rewritable (CD-RW) drive, a digital versatile disk-recordable (DVD-R) drive, a digital versatile disk-rewritable (DVD-RW) drive, or a digital versatile disk-random access memory (DVD-RAM) drive.

4. The method according to claim 1 wherein said first specified situation of said focusing error signal is a condition when a peak of said focusing error signal falls to a zero level at a first time under said focus adjustment operation.

5. The method according to claim 1 wherein said second specified situation indicates said sub-beam addition signal is at a level greater than said threshold value.

6. The method according to claim 5 further comprising a step of counting a predetermined time period when said sub-beam addition signal is at said level greater than said threshold value and said closed-loop enable signal is issued before outputting said focusing completion signal.

7. A method for outputting a focusing completion signal to realize a focusing condition of an optical pickup head for an optical access apparatus, said method comprising steps of:
   generating a focusing error signal and a sub-beam addition signal in response to optical signals from said optical pickup head under a focus adjustment operation;
   generating a closed-loop enable signal to enable a closed-loop control operation when a peak of said focusing error signal achieves to a first specified situation at a first time; and
   outputting said focusing completion signal on second specified conditions that said sub-beam addition signal is at a level greater than a threshold value and said closed-loop enable signal has been generated.

8. The method according to claim 7 wherein said optical access apparatus is a compact disk-read only memory (CD-ROM) drive or a digital versatile disk-read only memory (DVD-ROM) drive.

9. The method according to claim 7 wherein said optical access apparatus is a compact disk-recordable (CD-R) drive, a compact disk-rewritable (CD-RW) drive, a digital versatile disk-recordable (DVD-R) drive, a digital versatile disk-rewritable (DVD-RW) drive, or a digital versatile disk-random access memory (DVD-RAM) drive.

10. The method according to claim 7 wherein said first specified situation indicates a peak of said focusing error signal falls to a zero level at a first time under said focus adjustment operation.

11. The method according to claim 7 further comprising a step of counting a predetermined time period when said second specified conditions are fulfilled, and said focusing completion signal is outputted at an end of said predetermined time period.

12. A device for outputting a focusing completion signal to realize a focusing condition of an optical pickup head for an optical access apparatus, said device comprising:
   a focusing error signal generator electrically coupled to said optical pickup head for generating a focusing error signal and a sub-beam addition signal in response to optical signals from said optical pickup head under a focus adjustment operation;
   a focus control signal generator electrically coupled to said focusing error signal generator for generating a focus control signal in response to said focusing error signal; and
   a closed-loop enable signal generator for generating a closed-loop enable signal to enable a closed-loop control operation in response to a first specified situation of said focusing error signal, wherein a focusing completion signal is outputted when a level of said sub-beam addition signal is at a second specified situation in comparison to a threshold value and said closed-loop enable signal is issued.

13. The device according to claim 12 wherein said optical access apparatus is a compact disk-read only memory (CD-ROM) drive or a digital versatile disk-read only memory (DVD-ROM) drive.

14. The device according to claim 12 wherein said optical access apparatus is a compact disk-recordable (CD-R) drive, a compact disk-rewritable (CD-RW) drive, a digital versatile disk-recordable (DVD-R) drive, a digital versatile disk-rewritable (DVD-RW) drive, or a digital versatile disk-random access memory (DVD-RAM) drive.

15. The device according to claim 12 further comprising means for counting a predetermined period of time before outputting said focusing completion signal.

16. The device according to claim 12 wherein said closed-loop enable signal generator is included in said focus control signal generator.

17. The device according to claim 12 wherein said first specified situation indicates a peak of said focusing error signal falls to a zero level at a first time under said focus adjustment operation.

18. The device according to claim 12 wherein said focus control signal generator is a digital signal processor (DSP).

19. The device according to claim 12 wherein said focusing completion signal is outputted to a micro-controller electrically connected to said focus control signal generator.

20. The device according to claim 12 wherein said second specified situation indicates said sub-beam addition signal is at a level greater than said threshold value.

* * * * *